March 29, 1927.
J. H. MURCH
1,622,533
PROCESS OF PREPARING INTERIORLY COATED CONTAINERS
Filed Feb. 11, 1924
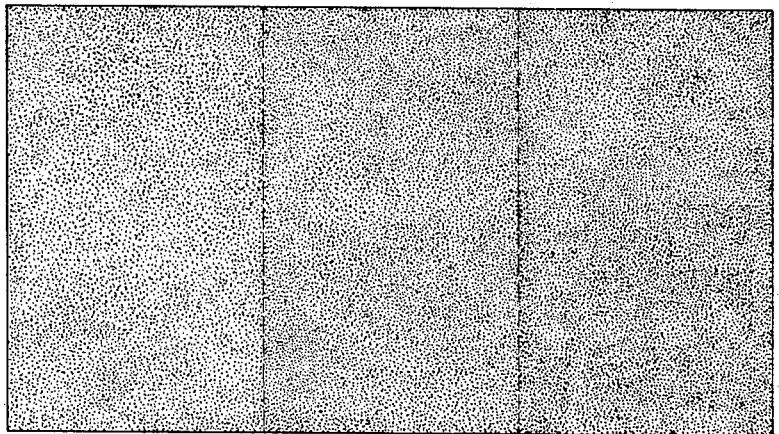
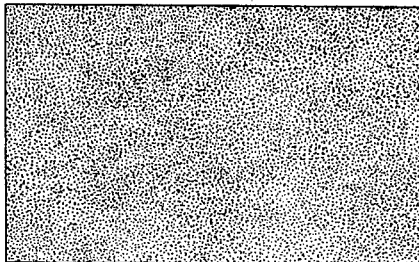
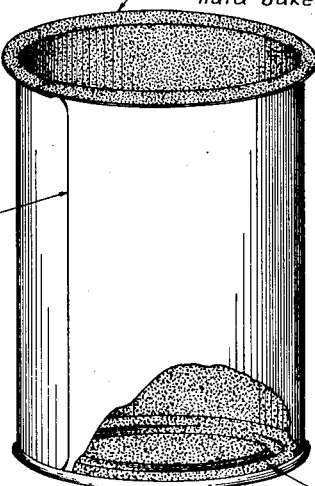
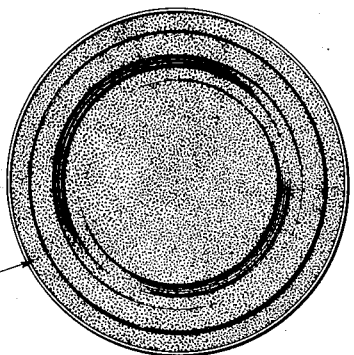
INVENTOR.
John H. Murch
BY
Munday, Clarke & Carpenter
ATTORNEYS Patented Mar. 29, 1927.

1,622,533

UNITED STATES PATENT OFFICE.

JOHN H. MURCH, OF PORTLAND, OREGON, ASSIGNOR TO AMERICAN CAN COMPANY, OF NEW YORK, N. Y., A CORPORATION OF NEW JERSEY.

PROCESS OF PREPARING INTERIORLY-COATED CONTAINERS.

Application filed February 11, 1924. Serial No. 692,198.

My invention relates to the art of can making and pertains particularly to rendering metallic containers of the open end so called sanitary type used for enclosing acid fruits, and other products, more resistant to the action of such contents than has formerly been possible.

In order to make the invention more clearly understood there are shown in the accompanying drawings means for carrying the same into practical effect, without limiting the improvements, in their useful applications, to the particular constructions which, for the purposes of explanation, have been made the subject of illustration. In the said drawings:

Fig. 1 is a plan view of a standard size sheet of tin plate with a coating of lacquer hard baked thereon.

Fig. 2 is a plan view of a sheet of tin plate, one-third the size of that shown in Fig. 1, and representing a blank which makes up the can body shown in Fig. 3.

Fig. 3 is a perspective of an open top sanitary can with a lower part broken away to illustrate part of the drawn bottom and double seamed to the can body; and Fig. 4 is a plan view of a drawn can end with a second coating of lacquer hard baked thereon.

In the drawings which clearly illustrate the process, reference numeral 11 indicates a sheet of tin plate of large standard size, such as is received in the can making factory from the tin plate mill. A protective coating 12 of suitable lacquer is applied to that side of said sheet of tin plate which is later to form the inside wall of the can body and said sheet of tin plate with the wet lacquer coating is then passed through a baking oven under a temperature of from 400 to 415 degrees Fahrenheit. The sheet is then passed through a slitting machine which cuts or slits the sheet into a number of equal portions according to the size of the can body to be produced from one blank portion, along the lines 13 of Fig. 1, resulting in the present illustrated instance in three can body blanks of the size shown in Fig. 2.

The small can body blanks 12 obtained from the larger sheet of tin plate 11 are then formed into the cylindrical can body 15, having top and bottom flanges 16 and a soldered lock and lap side seam 17.

Other large sheets like the one shown in Fig. 1 instead of being used for can body blanks, may be passed through a drawing press to produce drawn or stamped out can ends 14, like the one illustrated in Fig. 4, which are to form the top and bottom of the sanitary can 15, the flanges 18 of said ends being interposed with the flanges 16 of the can bodies to form the usual double seam 19.

It will be apparent from the drawings that the internal can body wall and top and bottom flanges, having been produced from the single blank 12 which together with the other two portions which make up the larger sheet of tin plate have already been coated with lacquer and hard baked, need no additional coating of hard baked lacquer, whereas the can end 14 which is also produced from a similar large sheet 11 which has been previously coated with lacquer and hard baked, needs an additional coating of hard baked lacquer because the can end, unlike the can body, in going through the drawing operation has been put under great strain and the original coating of lacquer has also been strained and broken at points of greatest strain.

In packing fruits and other products of nature in the open end sanitary type of metallic containers it has been found that the juices of many of the fruits contain corrosive substances of an acid nature and that these substances combining with the oxygen contained in the air cells of the fruits and the air included in the liquids used in canning processes have a very deleterious effect on the metal walls of the containers and, under ordinary conditions quickly attack the metal and produce an effect called pinholing, which is entirely destructive in its action and renders the container useless, and is the direct cause of much spoilage through admitting air and bacteria into the contents of the can.

To obviate this trouble it has been the practice to coat the large sheets from which cans are made, with a protecting lacquer and baking it on at what was thought to be a sufficiently high temperature, after which body blanks and ends were cut from these sheets and cans made therefrom with the enamel coating inside, and one end of the can open. For some mild fruits and other products this simple enameling process has been sufficient to protect the metallic walls of the containers against the slight corrosive action of the contents.

After a time it was found that the more aggressive fruit jucie acids penetrated this enameling and attacked the metal underneath. The effect being more marked wherever the sheet metal was bent or stretched during the forming and drawing operations. This bending and stretching of the metal having the effect of breaking the continuity of the enamel coating and producing minute openings resembling a porous surface, so that any liquid of a corrosive nature could easily penetrate to the metal and begin its act of disintegration resulting in pinholing.

When this trouble became evident it was decided to re-enamel the whole interior surface of the completed cans after forming, to cover up and re-coat all surfaces that had been subject to bending or drawing, so that the newly applied coating lying over the first or original coat of enamel or lacquer would give the protection desired. It being understood that the sanitary open end can is finally hermetically sealed in the canning factory where the fruits or other products are put in the cans so that in re-enameling the open end can the end to be applied by the canner is also re-enameled so that when the can is finally hermetically sealed the whole of its interior surface will have had applied thereto two coats of protecting enamel or lacquer and the same baked on the surface by passing through a heated enamel baking oven.

The theory of re-enameled cans is all right and the results in practice have been generally satisfactory, providing the cans, after packing are not carried in stock too long. I have found that if food products of an acid nature are packed in the ordinary re-enameled cans, and, owing to market conditions or other causes the packer holds his pack over a period of months, he will have a considerable loss from pinholing as I have described.

This pinholing occuring in spite of the re-enameling of the cans, and since it is produced by a progressive action it will make itself manifest according to the vigorousness with which the corrosive fluids attack the metal of the containers, and the length of time in which they have to act.

I have discovered the reason for this and my invention disclosed herein has proven to almost completely obviate these troubles.

In the making of the open end or sanitary type of can the rectangular body blanks are formed by suitable machinery into can bodies and the hooked edges interlocked by the well known lock and lap side seam, wherein the central portion is a lock seam and a small portion of each end of the seam is lapped in order to give only two thicknesses of tin where the flanging of the body and double seaming of the ends thereto is effected.

This combined lock and lap seam is then made hermetic by soldering, using a solder usually composed of equal parts of tin and lead, which solder begins to melt around 370° F. and which is considerably softened and weakened at a temperature around 330° F.

It is thus seen that the temperature ordinarily employed for baking the re-enameled cans cannot be over 330° or the solder of the side seams will be softened and weakened, which must not be permitted or the side seams will not thereafter stand up under the final processing all canned fruits are subjected to.

The operation of re-enameling and baking completed cans is quite an arduous task.

There are two general tyse of machinery used in spraying the cans in the re-enameling process.

In order to spray cans at a commercially practical speed to supply the great demand for these cans at such times as they are required in large quantities it is necessary to have spraying machinery of large size and capacity, each machine handling a large number of cans at one time.

Associated with the spraying machines are drying ovens that must be large enough to accommodate the cans and separate ends as rapidly as they come from the spraying machines, and must subject them to the 330° F. internal heat of the oven long enough to bake the enamel. Such machines are quite cumbersome and require a vast floor space and on account of their great size tend to limit the output of a factory and greatly handicap the factory in all of its operations, at times holding the production of the factory down to only half its capacity. It being understood that these ovens are adapted to handle open end re-enameled cans and separate re-enameled can covers at the same time.

Through exhaustive experiments I have discovered that part of the trouble experienced with the re-enameled cans has been due to baking the lacquer or re-enamel coating at too low a temperature, which temperature as I have pointed out must be under the weakening point of the solder in the side seam of the can, or not over about 330° F.

My experiments have disclosed two specific points.

First—that if the baking temperature is maintained at or around 400 to 415° F. the resultant enamel surface is rendered much more acid resistant than heretofore, and can ends so treated have completely resisted the attacks of the most highly corrosive fruit juices over long periods of time, and the high temperature enamel does not soften under the heat of final processing.

Second—I have discovered that the ordinary method of re-enameling finished cans does not reach the seat of greatest trouble from pinholing.

When can ends are formed and shaped in the drawing dies, the parts of the metal forming the vertical annular wall just inside the extended flange of the formed end, which is the part that fits tightly inside the mouth of the can, is subjected to the greatest drawing strains, and that the lacquer coating as well as the tin coating is made more open and porous than elsewhere on the end. Now, since this strained vertical wall surface is covered by the tight fit in the mouth of the can it is so placed that the sprayed second coat of lacquer cannot reach it, of course, a coating of lacquer will partially seep into the corner formed by the end and wall of the can, but it will in no sense be uniform or regular so that enough of the cans will admit the highly corrosive fruit juices into this space to cause the trouble related.

I have also found that in the present method of forming enameled can bodies from previously enameled sheets, baked at a high temperature, above that of melting solder, the sheets may be cut and formed into can bodies, and the side seams formed and soldered without in any appreciable manner effecting the enamel or lacquered coating. The bending and interlocking of the metal at the edges of the sheets to form the lock and lap side seams does not interfere with the coating to any detrimental extent. Can bodies so formed, have, in my experiments, resisted all attacks of the highly destructive fruit juices, while the vertical walls of the ends have been pinholed thereby.

The result of these experiments has made it evident that the can ends are the only parts of the can needing a second coat of enamel or lacquer after being formed, and it is a principal object of my invention to provide a process of interiorly coating cans having a much more acid resistant surface coating than has heretofore been possible.

The vital object of my invention is to render all of the interior surfaces of a commercial can resistant to acids contained in vegetable juices, especially of fruits.

My process will entirely eliminate the large and heavy spraying machinery and baking ovens now employed and give the floor space up for other purposes.

Any commercially available apparatus for spraying formed can ends in large quantities may be used and any ordinary type of high temperature oven will be suitable to properly bake the re-enameled ends.

My complete process for producing re-enameled cans having the interior surface that will resist the highly corrosive juices of certain fruits will embody practically the following steps and procedure.

The large sheets of tin from which can bodies are cut will be enameled in practically the same manner as at present; will be placed in ovens carrying a temperature around 400 to 415° where they will be baked for a sufficient length of time to produce a very hard resistant enameled surface.

These sheets will then be cut into body blanks and made up into can bodies in the ordinary manner having the hard enameled surface on the interior of the bodies, the folding of the edges of the body to form the lock and lap side seam having no deleterious effect on the enamel coating.

The large sheets from which can ends are to be produced will be coated in the sheet and treated in exactly the same manner as the sheets for the body blanks just described.

Can ends will be cut from these sheets in the same manner by the same dies and machinery as is now used for this purpose. This drawing and forming of the can ends by suitably constructed dies, will have the effect of drawing and distorting the enameled surface as well as the tin coated surface underneath the enamel and giving it a porous open nature wherever the metal is drawn over a corner or given any distinct profile. This stretching and drawing of the metal and the coating thereon will be most marked where the shoulder just inside the outer flange of the can end is formed, which shoulder when the can is made fits within the mouth of the can.

Having determined from my previous exhaustive experiments that this drawing of the metal in the forming of the can ends will so break the continuity of the enamel and tin coatings as to permit the corrosive fruit juices to enter and attack the metal, the next step in my process is intended to remedy this condition and repair the broken surface of the enamel coating above referred to.

This step in the process contemplates taking these once coated can ends and passing them through any commercial spraying machine adapted to handle such articles in large quantities and coating the entire inner surface of the now formed can end with a second coating of enamel or lacquer which will completely cover up and eliminate all abrasions, porosity or disrupted portions of any part of the first enamel coating.

These double coated can ends will now be passed through suitably arranged baking ovens and the second coating baked at a temperature of from 400 to 415° F. which will give the highly resistant surface that I have found by experiment to be the best in withstanding the corrosive attacks of the most destructive fruit juices, which temperature is often or usually higher than the melting point of the solder of the side seam.

These double coated can ends are now used in the can factory for closing one end of the sanitary can and since the ends are provided over the entire interior with the double coating of high temperature enamel no metallic surfaces will be exposed on the interior of such a can for the destructive juices of the contents to attack.

These same can ends having the double coated high temperature enamel will be sent to the canning factory and be used by the canner for finally closing the cans after the contents are placed therein.

Practically all food products placed in enameled sanitary cans receive a processing in steam retorts after the cans are finally and parmanently closed by the canner.

There have been times when this final processing or sterilizing of the food in the containers at the proper temperature for producing the necessary sterilization has been sufficient to somewhat soften the enamel coating of cans where the enamel has been baked on at temperatures not over 330° F., which as I have described is the weakening point of the soldered joints, and this softening of the enamel coating together with the action of the hot fruit juices have had a tendency to disturb its attachment to the metal surface of the can body which has later resulted in the corrosive fruit juices getting through the enamel and attacking the metal of the cans.

It might here be thought that in the ordinary manner of re-enameling cans the under coating of enamel or lacquer, on account of having been baked at a high temperature would resist this processing heat and tend to protect the metal surfaces of the container, and this might be true if the second coating of enamel had been baked on in a temperature higher than 330° F., but in baking this second or re-enameled coating on at 330° F., the effect of the previously high temperature baking was more or less lost. The second coating is applied in a liquid spray, and is made liquid by a suitable solvent; this solvent, as soon as applied, will immediately begin to penetrate the first high temperature coating and tend to soften it and as it passes through the oven at a temperature of only 330° F. the two coatings are somewhat amalgamated and when they leave the oven are in substantially the condition of a very heavy coating applied, all at the same time and baked on at 300° F.

The enamel coatings of cans made under my improved process being baked on at a temperature of from 400 to 415° F. renders the enamel so resistant to the ordinary processing or sterilizing temperatures that practically no softening or changing of the surface takes place under these temperatures.

Can ends being thin articles can be handled in great numbers on a flat conveyor running through a moderately sized baking oven and be subjected to the high temperatures long enough to produce the kind of surface desired and thus do away entirely with the massive baking ovens now required to simultaneously handle complete cans and can ends after being sprayed in the ordinary process of re-enameling.

The saving in floor space by the elimination of the large and cumbersome spraying machine and the large ovens is of very considerable moment. Large machinery of this class has a heavy upkeep expense and owing to its large size cannot be operated at economical speeds which, as I have stated, has been the cause of keeping down production in the factories using this equipment.

This saving of machinery and floor space together with the saving of enamel that has heretofore been sprayed onto the inside of the cans bodies in the ordinary re-enameling process is sufficient to convert an unprofitable line of manufacture into one giving a good return upon the investment and at the same time eliminating the troubles incident to the pinholing of food containers long after they have left the canning factory and the claims that are many times paid by the manufacturer for such loss of cans and food products.

While I have found in my experiments with the lacquers and enamels at my disposal that a temperature of from 400 to 415° F. is necessary to give the results I have enumerated, I do not wish to confine my invention to this exact temperature or to the exact kind and composition of lacquers and enamels that I have experimented with, as even these lacquers and enamels under certain conditions may be made sufficiently resistant to serve every purpose for certain food products or other products put into metal containers at somewhat lower temperatures than I have mentioned, but which temperatures are still somewhat above the weakening point of the soldered joints. New lacquers and enamels may be at our disposal at any time in the future and it may be found that a sufficiently resistant surface may be produced with different temperatures than I have mentioned.

The particular point I wish to bring out is that my discovery contemplates the elimination of the second coating of enamel that has been previously applied to the interiors of the cans after the bottoms have been applied thereto and further contemplates the applying of a second coat of enamel to the can ends before they are secured to the can bodies; baking these coatings onto the surfaces of the metal at a sufficient temperature to render them resistant to the corrosive juices of whatever may be put into the cans and thereby covering up and coating all abraided or porous surfaces produced in the manufacture of the can parts, and to resist softening under the final processing heat when the cans are packed.

In using the term "high temperature" or "hard baked" in this specification and claims I wish it understood to mean temperatures above 330° F. the weakening point of soldered joints.

In the foregoing description I have referred to a double coating of the can ends to produce a completely resistant surface. I think this is the best practice but I wish it understood that my process contemplates the forming of can ends from uncoated sheets and then applying a coating of enamel or lacquer to the formed can ends to thoroughly coat and cover the whole interior surface of the can ends and fixing said coating by subjecting it to the action of a high temperature.

It being understood that we are dealing with tin coated plate and this tin coating offers quite a measure of protection against the action of many of the liquids employed in canning food products.

In the drawing of can ends by means of drawing and forming dies from the tin coated sheets it is only the tin coating adjacent the abrupt bends or points of greatest stretching that the tin coating is disturbed sufficiently to permit the corrosive juices or liquids to reach the metal of the sheet and in many instances the single coating of lacquer or enamel baked on at a high temperature will be sufficient to give the protection desired.

Having thus described my invention what I claim as new and desire to secure by Letters Patent is:

1. The method of preparing internally lacquered sanitary cans which consists in lacquering the body sheet metal while flat, hard-baking said lacquer, forming the said sheet metal into can bodies with soldered side seams, lacquering the sheet metal of the can ends and baking the lacquer thereon and then forming the same into can ends, then applying a second coat of lacquer on said ends and hard-baking the same and then seaming said ends to said can bodies.

2. The method of protecting the interior surfaces of metal containers from the corrosive action of enclosed contents consisting in covering metal sheets with a protective coating and baking or fixing it at a temperature of approximately 400° F. to 415° F., forming can bodies and can tops and bottoms from said sheets, said can bodies having soldered side seams, applying a second coating of protective material to said can tops and bottoms after forming and baking said second coating on said tops and bottoms at a temperature of approximately 400° F. to 415° F. and then combining said parts to form completed containers.

3. The method of protecting the interior surfaces of the ends of metal containers from the corrosive action of enclosed contents consisting in covering metal sheets with a protective coating and baking or fixing it at a temperature above 330° F., forming can tops and bottoms from said sheets, applying a second coating of protective material to said formed can tops and bottoms and baking said second coating on said tops and bottoms at a temperature above 330° F.

4. The method of protecting the interior surfaces of metal containers from the corrosive action of enclosed contents consisting in covering metal sheets with a protective coating of lacquer and baking or fixing it at a temperature above 330° F., forming can bodies from said coated sheets, forming can tops and bottoms from uncoated sheets, covering said tops and bottoms with a protective coating of lacquer and baking or fixing it at a temperature above 330° F. and then combining said can parts to form completed containers.

5. An interiorly lacquered metal container of the sanitary type having a separately prepared body and end united by a double seam, said body having a soldered side seam, said body having an interiorly exposed coating of enamel baked at a temperature in excess of melting solder and said end having a hard baked first coating and an exposed second coating of enamel baked at a temperature in excess of melting solder.

JOHN H. MURCH.